J. Lattimer.
Shovel Plow.
Nº 8,802.  Patented Mar. 16, 1852.
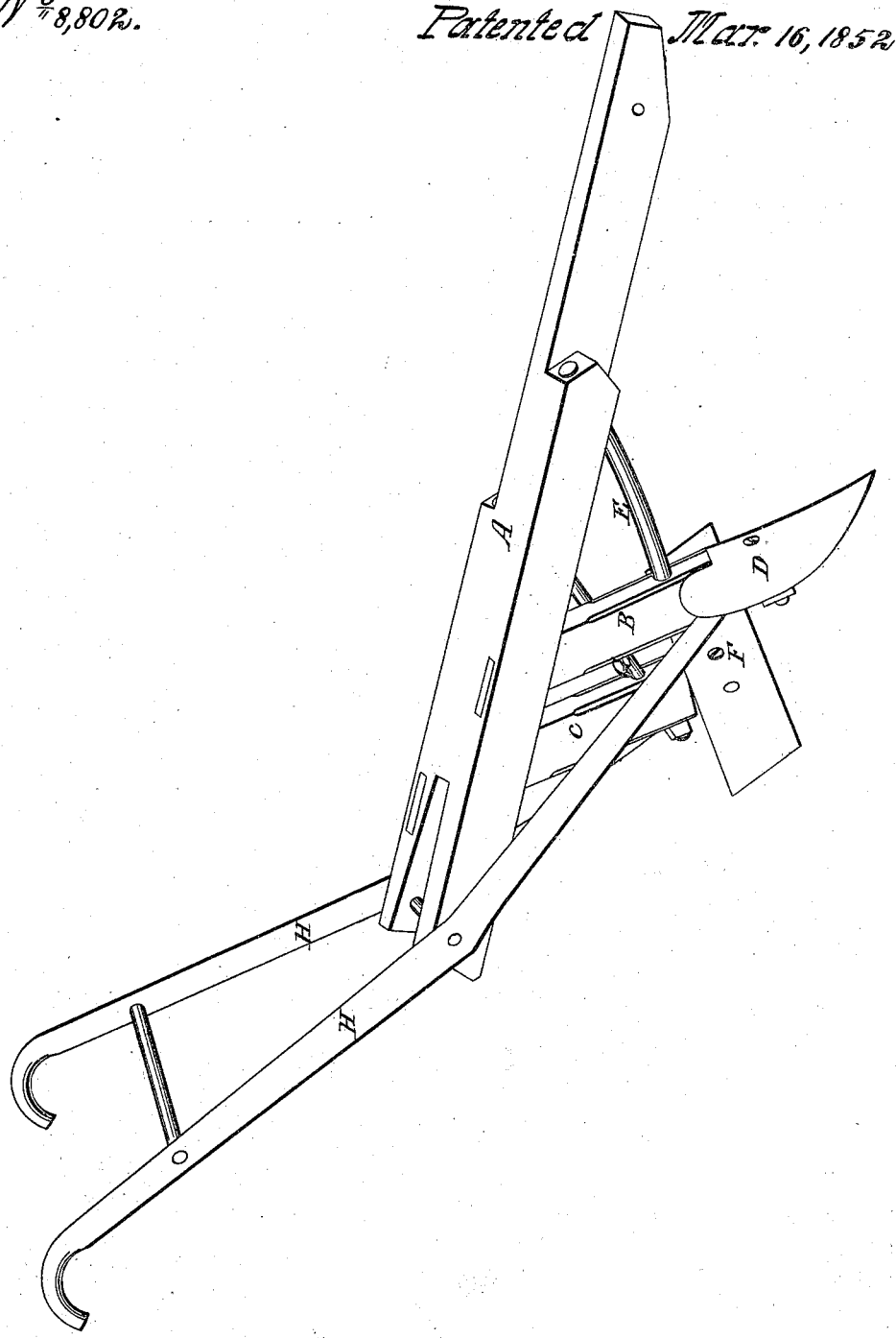

UNITED STATES PATENT OFFICE.

JAMES LATTIMER, OF CHATTOOGAVILLE, GEORGIA.

IMPROVEMENT IN SHOVEL-PLOWS.

Specification forming part of Letters Patent No. 8,802, dated March 16, 1852.

*To all whom it may concern:*

Be it known that I, JAMES LATTIMER, of Chattoogaville, in the county of Chattooga and State of Georgia, have invented certain new and useful Improvements in Cotton-Cultivators; and I do hereby declare the following to be a full, clear, and exact description of the same, reference being had to the accompanying drawing, making a part thereof, and which represents the cultivator complete.

The nature of my invention consists in arranging a beam capable of receiving two standards or stocks, upon one of which is placed a wing or half-shovel plow for the purpose of turning a furrow at any suitable distance from the cotton-rows, and the other for receiving a scraper, which is made adjustable, and which shaves off the grass, weeds, &c., from the side of the row and turns them into the furrow made by the plow, by which means the rows are kept clean and the grass, &c., buried in the furrow, which prevents it from taking root and growing again, and also allows the sun to warm the ground, which adds much to the vigor of the young plant.

In order to have as long a season as possible, the cotton-plant is planted very early in the spring, and requires the greatest attention to keep the grass and weeds from shading it and the ground around it, and preventing it from becoming warmed by the sun, so as to force it forward. This, by manuel labor, has been found both difficult and expensive, and to obviate and remedy these evils I have devised the within described cotton-cultivator.

The beam A is made of wood and of sufficient width at about its center longitudinally to receive the two standards or stocks B C, which are framed therein, the one, B, being in advance of the other. The beam may be cut away at either end, as seen in the drawing, to rid it of unnecessary weight.

To the stock B is firmly secured a wing or half-shovel plow, D, which is set deep enough to turn a furrow from the row of plants; and to strengthen the said stock an iron stay-rod, E, passes through a shoulder cut on the beam and through said stock, and is secured by a head at the shoulder and a screw and nut behind the stock.

To the stock C is attached the scraper F, which is provided with several holes for setting it forward or back on the stock, and a rounded shoulder is cut on the bottom of the stock to allow the scraper to be set with a greater or less inclination to said stock, and adapt it to higher or lower ridges or hills. The stock C is also provided with a stay-rod, G, passing through a shoulder cut in the opposite side of the beam from E, and secured in like manner with it, so as to bring the strain on said rod against the end of the grain of the wood. The scraper alone could not be operated, as from its necessary inclination it could not be held up to the ridges, but would be constantly thrown off; but by the addition of the plow to turn the furrow its hold in the ground enables the operator to guide the scraper with the greatest precision and ease.

It has been attempted to use a cultivator with scrapers on each side of the row, so as to straddle the ridge and make one hold against the other; but the old cotton-stalks, catching therein, break and injure the tender plants so much as to render them of no practical use. Great advantage is also gained by turning the grass over into the furrow, where it is almost entirely buried and prevented from regrowing.

The handles H are secured to the ends of the beam and pass down to near the bottom of the stocks on their outer sides, where they are permanently attached.

Having thus fully described my invention, what I claim therein as new, and desire to secure by Letters Patent, is—

The combination of the wing or half-shovel plow and the adjustable scraper, arranged on different stocks in the same beam, when said scraper is arranged on the landside and rearward of the plow, and so that the grass, weeds, &c., shaved off by the scraper will be thrown into the furrow made by the plow, the whole being arranged in the manner and specially for the purpose herein set forth and fully shown.

JAMES LATTIMER.

Witnesses:
A. B. STOUGHTON,
T. C. DONN.